(12) United States Patent
Shen et al.

(10) Patent No.: US 8,799,581 B2
(45) Date of Patent: *Aug. 5, 2014

(54) CACHE COHERENCE MONITORING AND FEEDBACK

(75) Inventors: Xiaowei Shen, Hopewell Junction, NY (US); David F. Bacon, Sleepy Hollow, NY (US); Robert W. Wisniewski, Ossining, NY (US); Orran Krieger, Newton, MA (US)

(73) Assignee: International Business Machines Corporation, Armonk, NY (US)

( * ) Notice: Subject to any disclaimer, the term of this patent is extended or adjusted under 35 U.S.C. 154(b) by 1490 days.

This patent is subject to a terminal disclaimer.

(21) Appl. No.: 11/620,323

(22) Filed: Jan. 5, 2007

(65) Prior Publication Data
US 2008/0168237 A1  Jul. 10, 2008

(51) Int. Cl.
*G06F 12/00* (2006.01)
*G06F 13/00* (2006.01)
*G06F 13/28* (2006.01)
*G06F 12/08* (2006.01)

(52) U.S. Cl.
CPC ................ *G06F 12/0815* (2013.01)
USPC ........... 711/141; 711/113; 711/118; 711/142; 711/143; 711/144; 711/145; 711/146

(58) Field of Classification Search
CPC  G06F 12/0842; G06F 12/121; G06F 12/0815
USPC .......................................... 711/118, 141–146
See application file for complete search history.

(56) References Cited

U.S. PATENT DOCUMENTS

| | | | |
|---|---|---|---|
| 5,287,508 A | | 2/1994 | Hejna, Jr. et al. |
| 5,784,066 A | | 7/1998 | Aizikowitz et al. |
| 5,913,222 A | | 6/1999 | Liedtke |
| 5,963,972 A | * | 10/1999 | Calder et al. ................... 711/129 |
| 5,999,727 A | | 12/1999 | Panwar |
| 6,073,225 A | * | 6/2000 | James et al. ................... 711/202 |
| 6,081,868 A | | 6/2000 | Brooks |
| 6,289,360 B1 | | 9/2001 | Kolodner et al. |
| 6,321,240 B1 | | 11/2001 | Chilimbi et al. |
| 6,330,556 B1 | | 12/2001 | Chilimbi et al. |
| 6,463,582 B1 | | 10/2002 | Lethin et al. |
| 6,477,634 B1 | | 11/2002 | Comment |
| 6,654,859 B2 | | 11/2003 | Wooldridge |

(Continued)

FOREIGN PATENT DOCUMENTS

JP       2000339220 A      12/2000

OTHER PUBLICATIONS

U.S. Appl. No. 11/620,293, filed Jan. 5, 2007, Xiaowei Shen.
U.S. Appl. No. 11/620,348, filed Jan. 5, 2007, Xiaowei Shen.

(Continued)

*Primary Examiner* — Yaima Rigol
(74) *Attorney, Agent, or Firm* — Ference & Associates LLC

(57) ABSTRACT

Color-based caching allows each cache line to be distinguished by a specific color, and enables the manipulation of cache behavior based upon the colors of the cache lines. When multiple threads are able to share a cache, effective cache management is critical to overall performance. Color-based caching provides an effective method to better utilize caches and avoid unnecessary cache thrashing and pollution. Hardware maintains color-based counters relative to the cache lines to monitor and obtain feedback on cache line events. These counters are utilized for cache coherence transactions in multiple processor systems.

17 Claims, 3 Drawing Sheets

| Index | Tag | MESI | Color | Data |
|---|---|---|---|---|
| 0 | 0 | 0 | 1 | Abc |
| 1 | 2 | 1 | 1 | Def |

Exemplary Implementation of Cache Table Using Color-based Caching

(56) References Cited

U.S. PATENT DOCUMENTS

| | | | |
|---|---|---|---|
| 7,200,721 | B1* | 4/2007 | Lang et al. .................. 711/141 |
| 7,395,279 | B2 | 7/2008 | Iyengar et al. |
| 7,434,002 | B1* | 10/2008 | Zedlewski et al. ............ 711/130 |
| 7,581,064 | B1 | 8/2009 | Zedlewski et al. |
| 2003/0023816 | A1 | 1/2003 | Kyker et al. |
| 2004/0123038 | A1 | 6/2004 | Shami et al. |
| 2005/0108298 | A1 | 5/2005 | Iyengar et al. |
| 2005/0188157 | A1 | 8/2005 | Kashyap |
| 2007/0157003 | A1 | 7/2007 | Durham et al. |

OTHER PUBLICATIONS

Min, Rui et al., "Improving Performance of Large Physically Indexed Caches by Decoupling Memory Addresses from Cache Addresses," IEEE Transactions on Computers, Nov. 2011, pp. 1191-1201, vol. 50, No. 11, IEEE Digital Library.

Bugnion, Edouard et al., "Compiler-Directed Page Coloring for Mulitiprocessors," ASPLOS VII, Oct. 1996, pp. 244-255, ACM Digital Library.

Kalamatianos, John et al., "Temporal-based Procedure Reordering for Improved Instruction Cache Performance," Proceedings of 1998 Fourth International Symposium on High-Performance Computer Architecture, Las Vegas, Nevada, USA, Feb. 1-4, 1998, pp. 244-253, IEEEXplore Digital Library.

Mayez A. Al-Mouhamed and Steven S. Seiden, "A heuristic storage for minimizing access time of arbitrary data patterns," IEEE Transactions on Parallel and Distributed Systems, vol. 8, No. 4, pp. 441-447, Apr. 1997.

"Evaluating Subject Matter Eligibility Under 35 USC 101," Aug. 2012 Updated, Office of Patent Legal Administration, United States Patent and Trademark Office. http://www.uspto.gov/patents/law/exam/101_training_aug2012.pdf.

* cited by examiner

| Index | Tag | MESI | Data |
|-------|-----|------|------|
| 0 | 0 | 0 | Abc |
| 1 | 2 | 1 | def |

Figure 1: Prior Art Cache Table

| Index | Tag | MESI | Color | Data |
|---|---|---|---|---|
| 0 | 0 | 0 | 1 | Abc |
| 1 | 2 | 1 | 1 | Def |

Figure 2: Exemplary Implementation of Cache Table Using Color-based Caching

**INV *C1, C2***
records that an invalidate transaction with color C1 invalidates a cache line with color C2.

**RD *C1, C2***
records that a read cache request with color C1 receives data from a cache line with color C2 via a cache-to-cache data transfer.

**RWITM *C1, C2***
records that a read-with-intent-to-modify cache request with color C1 receives data from a cache line with color C2 via a cache-to-cache data transfer.

Figure 3: Exemplary Hardware Counters

CACHE COHERENCE MONITORING AND FEEDBACK

This invention was made with Government support under Contract No.: NBCHC020056 PERCS I awarded by DARPA. The Government has certain rights in this invention.

FIELD OF THE INVENTION

The present invention relates generally to an architecture support that allows software to classify memory accesses to improve cache coherence monitoring and feedback.

BACKGROUND OF THE INVENTION

In modern microprocessors, memory access operations from different applications and the operating system are treated identically at the cache/memory side. When a cache or memory (or load-store queue in the processor) receives a memory access operation, it is unable to distinguish which thread or process has issued the memory request.

Difficult situations also arise when a cache is shared by many threads, or is in a multiprocessor environment. In such a situation, it is very important to be able to monitor cache behaviors for different threads or processes in order to more efficient manage those threads and processes. This is difficult or practically impossible if there is no way to tell which thread or process has issued a memory access request, such as in the cache/memory management systems of the prior art.

In addition to these issues concerning the anonymity of memory access requests in a cache, there are other problems that occur and cause deleterious effects on cache effectiveness and management. For example, false sharing can lead to cache thrashing. Cache thrashing occurs when two or more data items that are frequently needed by the program both map to the same cache address. Each time one of the items is encached, it overwrites another needed item, causing cache misses and impairing data reuse.

Cache efficiency can also be derailed by producer/consumer communication overhead. A producer process produces data which may be shared with other processes. A consumer process consumes the data produced (which may or may not change the data.) If these data associated with these processes are mapped to different caches, there is a lot of overhead that reduces the efficiency of communication. Further, if the consumer processes changes the data, invalidate lines in different caches and ensuring quality-of-service becomes a more difficult and time-consuming process.

Another process which reduces cache efficiency and increases unnecessary cache coherence overhead is cache pollution. Cache pollution refers to loading data into the cache that will not be reused before it is evicted. For example, this could occur when data from a streaming data access pattern is cached. This data would not be reused, and would thus pollute the cache line until it is removed.

Color-based cache monitoring allows each cache line to have a color and monitors various cache behaviors based on colors. In multiprocessor systems, improper thread placement can cause unnecessary cache coherence overhead. Color-based cache monitoring provides valuable runtime information that can be used by an Operating System to make thread scheduling and migration decisions to reduce producer/consumer communication overhead and/or cache thrashing due to false sharing.

SUMMARY OF THE INVENTION

This invention relates to color-based caching. Color-based caching allows each cache line to be distinguished by a specific color, and enables the manipulation of cache behavior based upon the colors of the cache lines. When multiple threads are able to share a cache, effective cache management is critical to overall performance. Color-based caching provides an effective method to better utilize caches and avoid unnecessary cache thrashing and pollution. Hardware maintains color-based counters relative to the cache lines to monitor and obtain feedback on cache line events. These counters are utilized for cache coherence transactions in multiple processor systems.

In one aspect, the instant invention provides an apparatus for guaranteeing Quality-Of-Service of cache utilization, said apparatus comprising a generator that generates memory access operations in response to software, an assignor that assigns a color to memory access operations, a receiver that receives and records color information for each cache line based upon the operation utilizing the cache line, wherein the hardware maintains at least one color-based counter.

In another aspect, the instant invention provides a method of guaranteeing Quality-Of-Service of cache utilization, said method comprising the steps of generating memory access operations in response to software, assigning a color to memory access operations, receiving and recording color information for each cache line based upon the operation utilizing the cache line, wherein the hardware maintains color-based counters.

In a third aspect, the instant invention provides a program storage device readable by machine, tangibly embodying a program of instructions executable by the machine to perform method steps for monitoring cache coherence, said method comprising the steps of generating memory access operations in response to software, assigning a color to memory access operations, receiving and recording color information for each cache line based upon the operation utilizing the cache line, wherein the hardware maintains color-based counters.

For a better understanding of the present invention, together with other and further features and advantages thereof, reference is made to the following description, taken in conjunction with the accompanying drawings, and the scope of the invention will be pointed out in the appended claims.

BRIEF DESCRIPTION OF THE DRAWINGS

FIG. 1 shows cache table of the prior art that is using the MESI protocol

FIG. 2 shows an exemplary implementation of color-based memory semantics according to the present invention.

FIG. 3 shows a group of exemplary hardware counters that can be used by software for color assignment and color management.

DETAILED DESCRIPTION OF THE PREFERRED EMBODIMENTS

Several other co-pending and commonly owned U.S. patent applications, filed concurrently herewith, disclose various processes and arrangements whose details may, in the role of background information, help provide a better understanding of one or more of the embodiments disclosed and contemplated herein. Accordingly, those applications are hereby fully incorporated by reference as if set forth in their entirety herein, and are as follows (including the title and attorney docket number for each one): "Memory Access Coloring Architecture Support" and "Color-based Cache Monitoring".

This disclosure relates to color-based caching. Color-based caching allows each cache line to be distinguished by a specific color, and enables the manipulation of cache behavior based upon the colors of the cache lines. When multiple threads are able to share a cache, effective cache management is critical to overall performance. Color-based caching provides an effective method to better utilize a cache and avoid unnecessary cache thrashing and/or pollution. Color-based caching is carried out by both the Operating System and the software. Specifically, the Operating System, in coordination with the software, can dynamically determine the characteristics of given threads and assign cache lines colors that correspond to these threads. Thus, data from certain threads that are distinguished by certain characteristics or colors will be maintained on cache lines that are also distinguished by that specific color.

This color information is received and recorded by the hardware at the cache. Each cache line, corresponding to a memory access operation by a thread, has a color assigned to it. Although these colors may be thought of in an abstract sense as a finite "palette" of colors including "red" and "blue" and so forth, this "palette" of colors is in essence simply a finite amount of distinguishers of sets.

The instant invention is utilized in a system with multiple processors. Such a system, with separate caches, has a shared common memory. In a shared memory multiprocessor with a separate cache memory for each processor, it is possible to have many copies of any one instruction operand. Specifically, one copy of the instruction operand may be maintained in the main memory and one copy may be maintained in each cache memory. When one copy of an operand is changed, the other copies of the operand must be changed also. Cache coherence ensures that changes in the values of shared operands are propagated throughout the system in a timely fashion.

In the prior art, there are numerous cache coherency protocols, such as MOESI, in which cache lines maintain certain bits to signify state. In the MOESI protocol, two bits are used to signify the state of the cache line. These bits represent several distinct cache states that are well-known in the art (Modified, Owned, Exclusive, Shared, and Invalid). FIG. 1 depicts a cache table of the prior art that is using the MESI protocol. There are other protocols that utilize similar cache states (including Owned that are well-known in the art which use these or similar bits to maintain state or other information that enables better cache coherency and efficiency.

As mentioned above, cache coherence refers to the integrity of data stored in local caches of a shared resource. Coherence protocols are augmented with snooping and snarfing. Snooping is the process where the individual caches monitor address lines for accesses to memory locations that they have cached. When a write operation is observed to a location that a cache has a copy of, the cache controller invalidates its own copy of the snooped memory location. Snarfing is where a cache controller watches both address and data in an attempt to update its own copy of a memory location when a second master modifies a location in main memory.

The present invention maintains color state in the cache line, such that each cache line has a color. FIG. 2 depicts an embodiment of a cached color table, according to the present invention. The coloring of the instant invention is implemented through the hardware, specifically through color-based counters. The hardware is able to maintain a counter for each color that records the number of cache lines with the specific color in the cache (or cache set or cache way).

In multiple processor systems, the hardware maintains counters for coherence transactions. Given a pair of colors, the hardware can maintain a counter for any possible coherence transaction. Practically, this may not be the most efficient implementation of the instant invention. Thus, counters for different coherence transactions can be merged to reduce implementation overhead. The cache coherence protocol plays a large part in determining what counters need to be maintained. Examples of counters maintained with a MESI-like snoopy cache coherence protocol will be detailed below.

In general, the hardware can maintain the counters as a 2-dimensional matrix (event, C), or a 3-dimensional matrix (event, C1, C2). The counter (event, C) represents the number of times that a specific event happens on color C. The counter (event, C1, C2) represents the number of times that color C1 interacts with color C2 with respect to a specific event. Examples of events include a cache coherence transaction such as invalidate, or a cache-to-cache data transfer. For example, the counter (replacement, C1, C2) represents the number of times that a cache line with color C1 has replaced a cache line with color C2. The cache controller can use the color-based monitoring information when making cache line replacement decisions. In practice, hardware may merge multiple counters to reduce the implementation cost (it is unnecessary to distinguish between every possible event).

FIG. 3 details an example group of specific hardware counters in the form of function calls that could represent the hardware counters of the instant invention. As mentioned above, the usage of hardware counters depends largely on what cache coherence protocol is being used. For example, with the MESI protocol detailed above, hardware can provide the following counters for each pair of colors C1 and C2. (INV, C1, C2) records that an invalidate transaction with color C1 invalidates a cache lines with color C2. The cache state transition is from S to I at the slave side. (RD, C1, C2) records that a read cache request with color C1 receives data from a cache line with color C2 via a cache-to-cache data transfer. The cache state transition is from I to S at the master side. (RWITM, C1, C2) records that a read-with-intent-to-modify cache request with color C1 receives data from a cache line with color C2 via a cache-to-cache data transfer. The cache state transition is from I to E at the master side.

The cache coherence monitoring information can be used by the Operating System to determine the cache coherence cost. For example, if the counter (INV, C1, C2) reaches some pre-defined threshold (assuming colors C1 and C2 represent 2 threads), it is an indication to the Operating System that there is a strong producer-consumer data access pattern between the two threads. To reduce the communication overhead, the Operating System can try to place the two threads on the same cache. Specifically, the instant invention will color cache lines appropriately such that those two threads utilize the same cache. There are numerous other manipulations of cache placement and coloring due to the counters that can be effected by the instant invention. These manipulations ensure that cache coherency in a multiprocessor system is maintained.

In summary, color-based cache monitoring allows each cache line to have a color and monitors various cache behaviors based on colors. This type of monitoring provides valuable run-time information that can be used by the Operating System to make thread scheduling and migration decisions to reduce producer/consumer communication overhead and minimize cache thrashing due to false sharing.

If not otherwise stated herein, it is to be assumed that all patents, patent applications, patent publications and other publications mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. An apparatus comprising:
   one or more processors having access to one or more caches, the one or more caches comprising one or more cache lines;
   a generator that generates memory access operations in response to software running on the apparatus;
   an assignor that assigns a color to the memory access operations;
   a receiver that receives and records color information for each cache line in response to a memory access operation utilizing a cache line; and
   a storage device configured to maintain the color information in color-based counters, wherein at least one of the color-based counters comprises one of:
   a first counter type comprising a two-dimensional matrix, the two-dimensional matrix including an event dimension and a color dimension, the event dimension representing a specific cache line event, the first counter type representing a number of times that the specific cache line event happens on a specific color represented by the color dimension; and
   a second counter type comprising a three-dimensional matrix, the three-dimensional matrix including an event dimension, a first color dimension, and a second color dimension, the event dimension representing a specific cache line event, the second counter type representing a number of times that, with respect to a specific cache line event, a color represented by the first color dimension interacts with a color represented by the second color dimension; and
   wherein hardware of the apparatus is configured to monitor said color-based counters to obtain feedback on one or more cache line events.

2. The apparatus according to claim 1, wherein the specific cache line event relative to the first counter type is a cache coherence transaction.

3. The apparatus according to claim 1, wherein the specific cache line event relative to the second counter type is a cache coherence transaction.

4. The apparatus according to claim 1, further comprising an Operating System;
   wherein the Operating System utilizes the color-based counters to determine a cache coherence cost.

5. The apparatus according to claim 4, wherein the Operating System determines the cache coherence cost by ascertaining if at least one color-based counter exceeds a predefined threshold.

6. The apparatus according to claim 5, wherein the Operating System may change utilization of cache lines based upon the cache coherence cost.

7. The apparatus according to claim 1, wherein the color-based counters are configured to merge a color-based counter with another color-based counter to reduce overhead.

8. The apparatus according to claim 1,
   wherein the color information maintained in the two-dimensional matrix represents a number of times that a cache line event happens on a color maintained in the color dimension.

9. The apparatus according to claim 1, further comprising:
   wherein the color information maintained in the three-dimensional matrix represents a number of times a first color interacts with a second color with respect to a specific cache line event.

10. The apparatus according to claim 1, wherein at least one of the color-based counters comprises the second counter type.

11. A method comprising:
    generating memory access operations in response to software, the memory access operations corresponding to accessing one or more cache lines of one or more caches;
    assigning a color to the memory access operations;
    receiving and recording color information for each cache line in response to a memory access operation utilizing a cache line;
    maintaining color information in a storage device in color-based counters, wherein at least one of the color-based counters comprises one of:
    a first counter type comprising a two-dimensional matrix, the two-dimensional matrix including an event dimension and a color dimension, the event dimension representing a specific cache line event, the first counter type representing a number of times that the specific cache line event happens on a specific color represented by the color dimension; and
    a second counter type comprising a three-dimensional matrix, the three-dimensional matrix including an event dimension, a first color dimension, and a second color dimension, the event dimension representing a specific cache line event, the second counter type representing a number of times that, with respect to a specific cache line event, a color represented by the first color dimension interacts with a color represented by the second color dimension; and
    monitoring the color-based counters to obtain feedback on one or more cache line events.

12. The method according to claim 11, wherein the specific cache line event relative to the first counter type is a cache coherence transaction.

13. The method according to claim 11, wherein the specific cache line event relative to the first counter type is a cache coherence transaction.

14. The method according to claim 11, further comprising utilizing an Operating System to access the color based counters and determine a cache coherency cost.

15. The method according to claim 14, wherein the Operating System determines the cache coherence cost by ascertaining if the a color-based counter exceeds a predefined threshold; and
    wherein the Operating System may change utilization of cache lines based upon the cache coherence cost.

16. The method according to claim 11, wherein the color-based counters are configured to merge a color-based counter with another color-based counter to reduce overhead.

17. A non-propagating program storage device readable by machine, tangibly embodying a program of instructions executable by the machine to perform steps for monitoring cache coherence, said steps comprising:
    generating memory access operations in response to software, the memory access operations corresponding to accessing one or more cache lines of one or more caches;
    assigning a color to the memory access operations;
    receiving and recording color information for each cache line in response to a memory access operation utilizing a cache line;

maintaining color information in a storage device in color-based counters, wherein at least one of the color-based counters comprises one of:

a first counter type comprising a two-dimensional matrix, the two-dimensional matrix including an event dimension and a color dimension, the event dimension representing a specific cache line event, the first counter type representing a number of times that the specific cache line event happens on a specific color represented by the color dimension; and a second counter type comprising a three-dimensional matrix, the three-dimensional matrix including an event dimension, a first color dimension, and a second color dimension, the event dimension representing a specific cache line event, the second counter type representing a number of times that, with respect to a specific cache line event, a color represented by the first color dimension interacts with a color represented by the second color dimension;

wherein the color information comprises a color-based counter corresponding to a cache line event; and monitoring the color-based counters to obtain feedback on one or more cache line events.

* * * * *